United States Patent
Christopherson, Jr.

(10) Patent No.: US 7,837,082 B2
(45) Date of Patent: Nov. 23, 2010

(54) POWDER METAL FRICITON STIR WELDING TOOL AND METHOD OF MANUFACTURE THEREOF

(75) Inventor: Denis Christopherson, Jr., Waupun, WI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 697 days.

(21) Appl. No.: 11/689,675

(22) Filed: Mar. 22, 2007

(65) Prior Publication Data

US 2007/0272724 A1 Nov. 29, 2007

Related U.S. Application Data

(60) Provisional application No. 60/802,753, filed on May 23, 2006.

(51) Int. Cl.
*B23K 20/12* (2006.01)
*B22F 3/00* (2006.01)

(52) U.S. Cl. .................. 228/2.1; 228/112.1; 75/228; 75/232; 156/73.5

(58) Field of Classification Search ............. 75/228, 75/232; 228/2.1, 112.1; 156/73.5
See application file for complete search history.

(56) References Cited

U.S. PATENT DOCUMENTS

| | | | |
|---|---|---|---|
| 5,611,479 A | 3/1997 | Rosen | |
| 5,769,306 A | 6/1998 | Colligan | |
| 5,813,592 A * | 9/1998 | Midling et al. | 228/112.1 |
| 5,975,406 A | 11/1999 | Mahoney et al. | |
| 6,399,018 B1 | 6/2002 | German et al. | |
| 6,648,206 B2 | 11/2003 | Nelson et al. | |
| 6,779,704 B2 | 8/2004 | Nelson et al. | |
| 6,939,509 B2 | 9/2005 | Kochanek | |
| 2004/0134972 A1 | 7/2004 | Nelson et al. | |
| 2004/0155093 A1 | 8/2004 | Nelson et al. | |
| 2004/0238599 A1 | 12/2004 | Subramanian et al. | |
| 2006/0157531 A1* | 7/2006 | Packer et al. | 228/2.1 |
| 2006/0169740 A1* | 8/2006 | Fukuhara et al. | 228/2.1 |
| 2007/0119276 A1 | 5/2007 | Liu | |

* cited by examiner

*Primary Examiner*—Roy King
*Assistant Examiner*—Ngoclan T Mai
(74) *Attorney, Agent, or Firm*—Robert L. Stearns; Dickinson Wright, PLLC

(57) ABSTRACT

A friction stir tool has an axis of rotation and a welding tip that is made of powdered metal material.

13 Claims, 3 Drawing Sheets

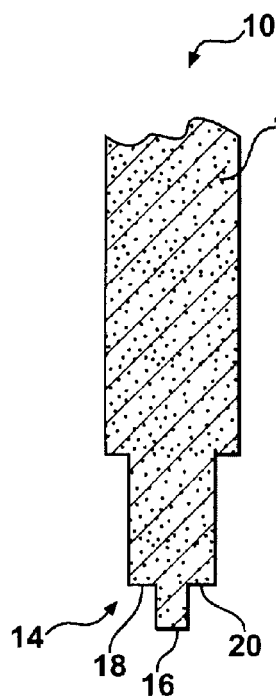
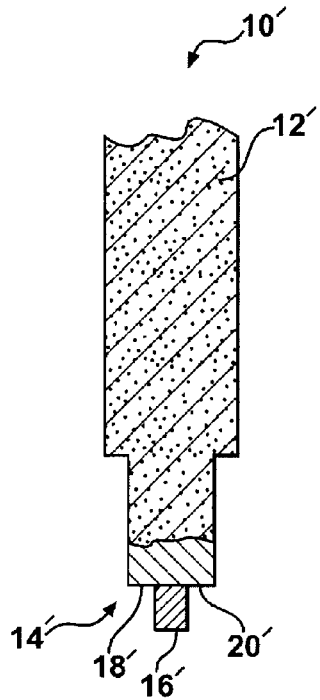
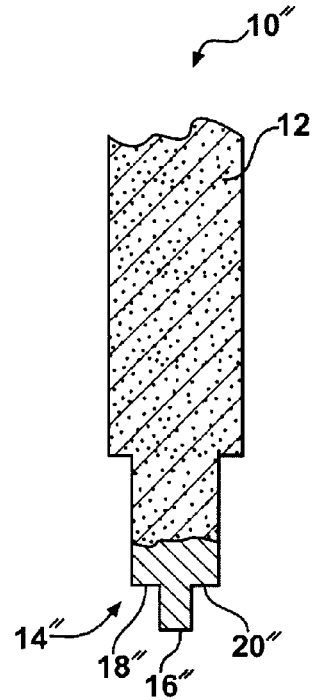
FIG - 5  FIG - 6  FIG - 7
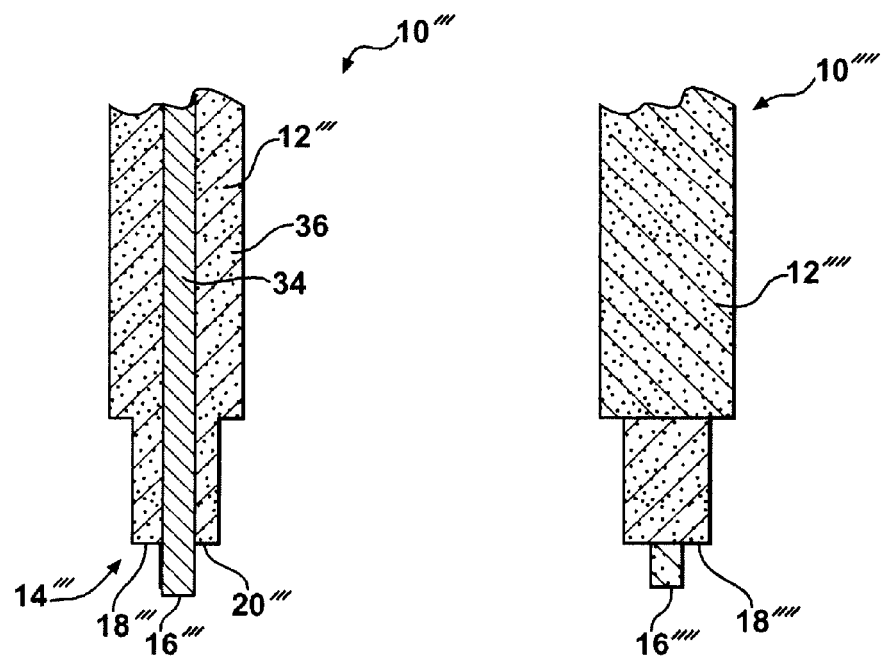
FIG - 8  FIG - 9

POWDER METAL FRICITON STIR WELDING TOOL AND METHOD OF MANUFACTURE THEREOF

This invention claims priority to U.S. Provisional Patent Application Ser. No. 60/802,753, filed May 23, 2006 and U.S. patent application Ser. No. 11/689,186, filed Mar. 21, 2007.

BACKGROUND OF INVENTION

1. Technical Field

This invention relates generally to friction stir welding tools, and more particularly to the materials used to make such tools.

2. Related Art

Friction stir welding is a technique whereby the tip of a rotating friction stir tool is first plunged into an unwelded joint of two abutting metal members to be joined, after which the rotating tool is traversed along the joint causing the materials of the two members to be heated sufficiently to reach a plastic state causing displacement or stirring of the plastic materials across the joint interface which, upon cooling, results in a metallurgical weld of the two materials. The technique can also be used to join stacked metal members whereby the rotating tool is plunged through one of the members and part way into the other and then moved along to weld them together.

Friction stir weld tools are typically wrought and then machined to the desired shape. For example, the tools can be cast from a desired metal alloy and then subjected to machining to impart the desired shape and features to the friction stir tool. The manufacturing and finishing processes can limit the selection of materials available for use as friction stir tooling and further add to the cost and complexity of forming such tooling.

SUMMARY OF THE INVENTION AND ADVANTAGES

The present invention is directed to a friction stir tool fabricated of powder metal material.

The invention further contemplates selecting any of a number materials for use in the powder metal manufacture of the friction stir tool. These include metal alloys, blends and admixtures of the desired constituents or combinations thereof.

The invention further contemplates the use of high wear, high friction composite materials, such as cermets, and the like to achieve a long lasting but highly effective friction stir tool.

The invention further contemplates the use of additives to the powder metal mix prior to heating to enhance the manufacturing efficiencies and improve the resulting strength and other properties of the friction wear tool.

The invention further contemplates the use of a heat treating process near ambient pressure.

According to a further particular feature of the invention, the powder metal friction stir tool can be treated to enhance its wear and/or friction characteristics. According to a particular embodiment, the powder metal friction stir tool is iron-based and the active surfaces or a portion of the active surfaces of the friction stir tool are steam treated to induce the formation of $Fe_3O_4$, which is a stable form of iron oxide and imparts high wear and enhanced friction characteristics to the working surfaces or portion of the surfaces as desired of the powder metal friction stir tool.

According to a further particular feature of the invention, it is contemplated that the powder metallurgy process will enable the formation of a gradient structure in either materials and/or properties of the friction stir tool to take advantage of cost and performance benefits that can arise from such a gradient structure. For example, the leading tip or plunger portion of the friction stir tool can be fabricated of a very hard and perhaps more costly powder metal composition, whereas the friction shoulder surfaces of the friction stir tool can be fabricated of a different material which is also wear resistant but may have enhanced friction inducing characteristics to maximize the heating and stirring affect of the tool. Other possibilities include forming the shank of the friction stir tool of one material (perhaps a lower cost material suitable for chucking the tool) while the remaining operating free end of the friction stir tool is made of a different material, either together or separately from one another and thereafter joined together. Still a further example can include forming the core or center of the friction stir tool of one powder metal composition while the outer portion or sheath of the friction stir tool is made of another material. It will be appreciated at the combinations of materials and their relative arrangements are too numerous to list and that the intent of the present invention is to capture and contemplate the broad concept of using powder metallurgy to achieve a gradient structure in a friction stir tool.

According to another aspect, the invention provides a method of manufacturing a friction stir welding tool. The method includes compacting a powder mixture and sintering the powder mixture at about ambient pressure which is not under vacuum. Another aspect of the method includes sintering the powder mixture in a continuous-style furnace.

Yet another aspect of the method includes manufacturing a friction weld tool including compacting at least two separate portions of the tool separately from one another and joining them to one another. Another aspect of this method includes sintering adjacent ones of the separate portions to one another.

BRIEF DESCRIPTION OF THE DRAWINGS

These and other advantages and features of the present invention will become more readily appreciated when considered in connection with the following detailed description and drawings, in which:

FIGS. 5 through 9 are cross-sectional views illustrating different embodiments of friction stir weld tools constructed according to the present invention.

DETAILED DESCRIPTION

In friction stir welding, a cylindrical, shouldered tool with a profiled probe is rotated and slowly plunged into the joint line between two pieces of sheet or plate material, which are abutted together. The parts are clamped in a manner that prevents the abutting joining faces from being forced apart as the tool is plunged into and moved along the joint. Frictional heat is generated between the wear resistant welding tool and the material of the work pieces. This heat causes the latter to soften without reaching the melting point and allows traversing of the tool along the joint line. The plasticized material is transferred from the leading edge of the tool to the trailing edge of the tool probe and is forged by the intimate contact of the tool shoulder in the pin profile. This leaves a solid phase bond between the two pieces as the tool passes by. This process can be regarded as a solid phase keyhole welding technique, since a hole to accommodate the probe or tip of the tool is generated, and then filled during the welding sequence.

Figure 1:
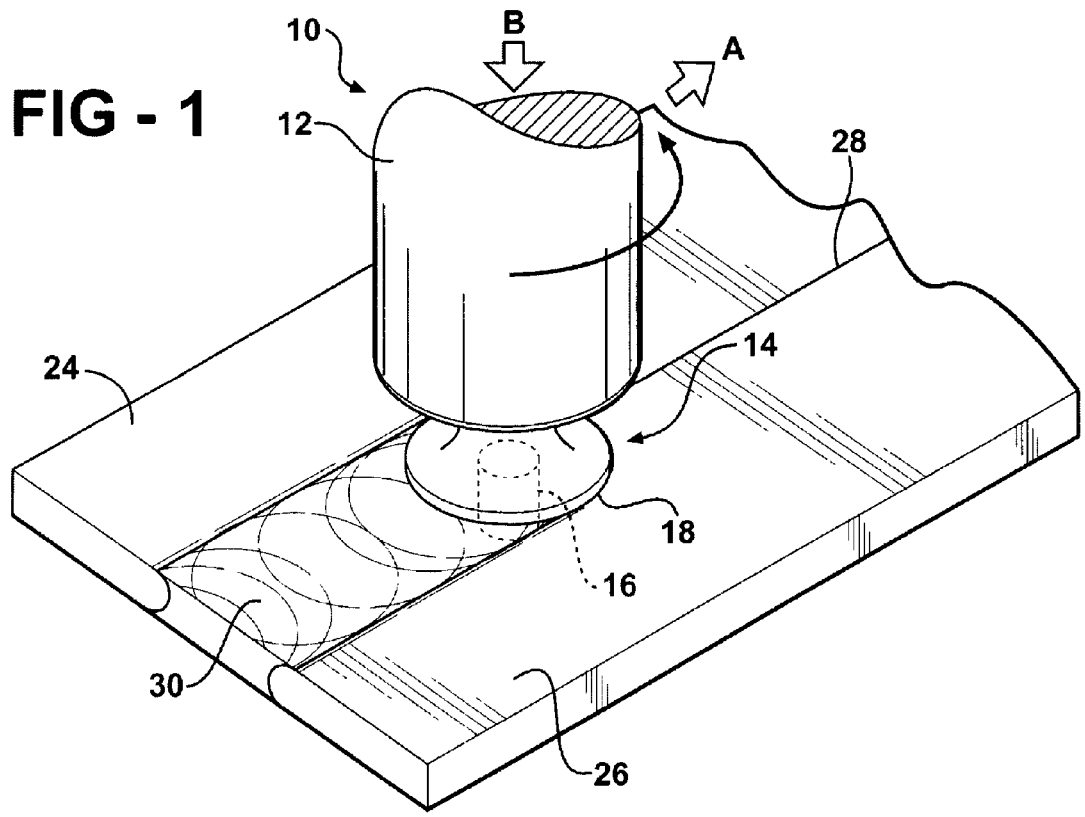
FIG. 1 is a schematic perspective view illustrating the principles of friction stir welding.

FIG. 1 illustrates the general principle of friction stir welding employing the friction stir weld tool according to the invention. The friction stir weld tool is generally shown at 10 and may comprise a generally cylindrical shank 12 that enables the tool 10 to be chucked in a rotating tool holder (not shown). The tool 10 includes a working free end 14 which includes a plunger tip or probe 16 which projects centrally from the free end 14 of the tool 10. Spaced from the free end of the probe 16 is a shoulder 18. A face 20 (FIG. 3) of the shoulder 18 and an outside diameter surface 22 of the probe 16 serve as the functional surfaces in contact with at least two work pieces 24, 26 to effect the formation of a friction stir weld.

Figure 2:
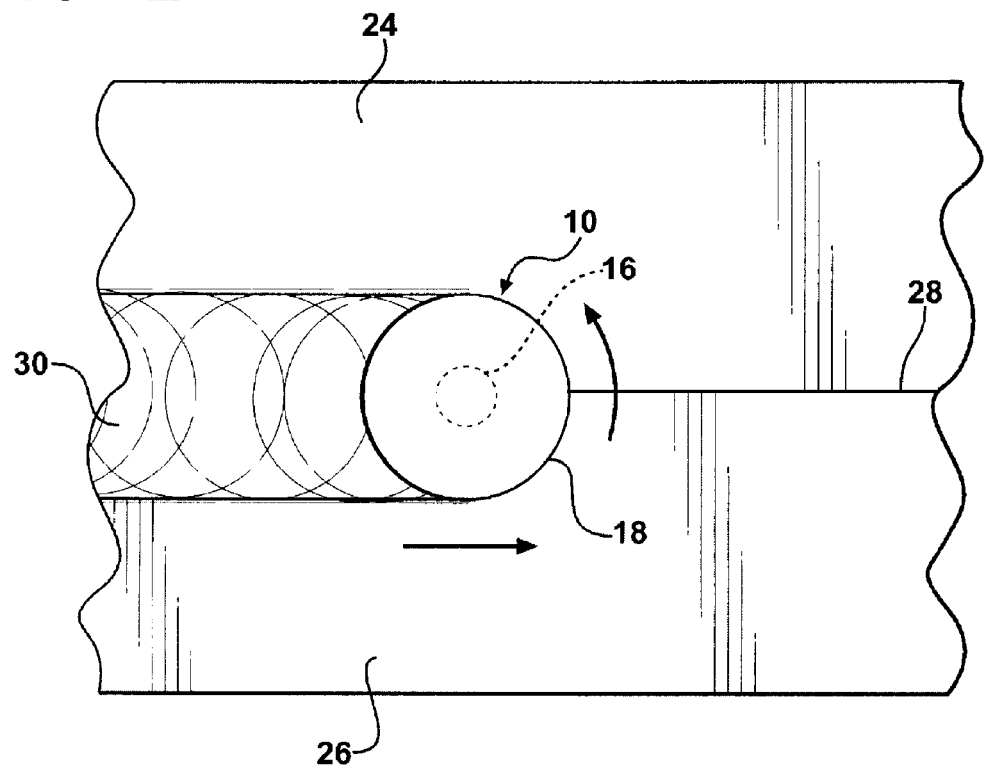
FIG. 2 is a schematic plan view illustrating principles of friction welding.

As mentioned above, the probe 16 is plunged into an abutting joint 28 between the two work pieces 24, 26 while the tool 10 is being rotated. The tool 10 is then advanced along the joint 18 in the direction of arrow A as the tool continues to rotate. The face 20 of the shoulder 18 is pressed down in the direction of arrow B against the upper surfaces of the work pieces 24, 26 on either side of the joint 28 to further work and stir the plasticized metal at the surface to yield a metallurgical weld 30 across the joint 28. FIGS. 1 and 2 illustrate the construction and operation of the tool in forming the joint 28.

Figure 3:
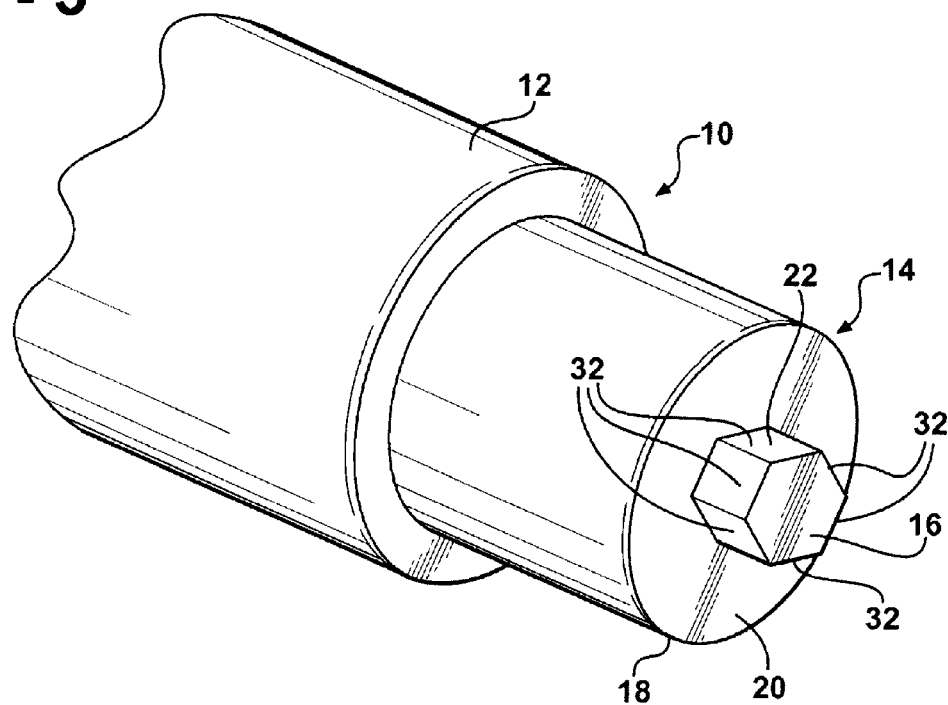
FIG. 3 is an enlarged fragmentary perspective view of a tip end of a friction stir welding tool.
Figure 4:
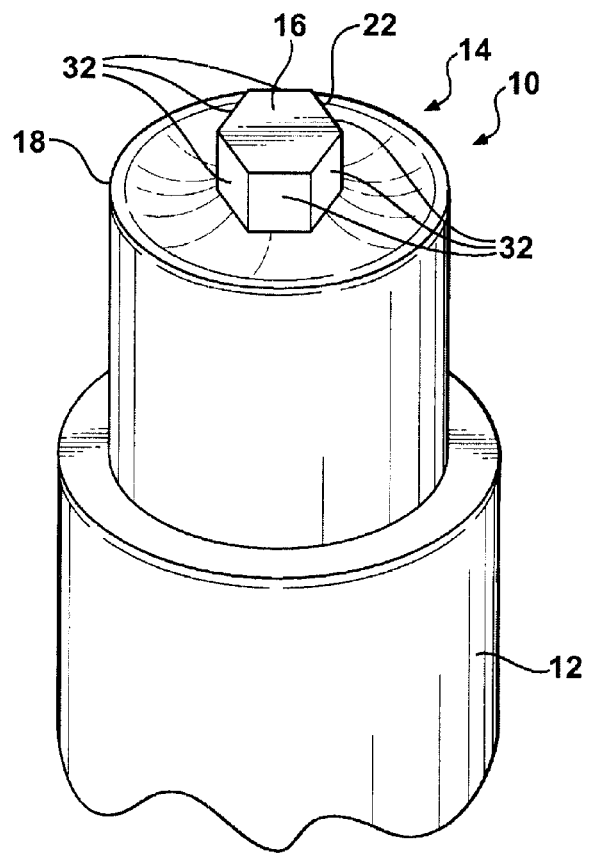
FIG. 4 is a further enlarged perspective view of the tip end of a friction weld stir tool.

The friction stir weld tool 10 can take on any of a number of shapes and features. FIGS. 3 and 4 illustrate one embodiment of the working free end of a tool 10. It can be seen that the probe 16 may be other than cylindrical and provided with flats 32. The present invention is not limited to any particular shape and/or size of the tip 16, nor are their limits to the number and shape of various surfaces on the tip 16. FIGS. 3 and 4 further illustrate the face 20 of the shoulder 18 as having a cupped or concave configuration. This may assist in the friction stir welding of the materials, but the invention is not to be limited to any particular shape of face 20 of the shoulder 18. The overall configuration of the friction weld stir tool 10 is not limited to the disclosed embodiment, which is meant to be exemplary, and contemplates any friction stir tool configuration suitable for friction stir welding that may be presently available or developed in the future.

Turning now to particular aspects of the present invention, at least the working free end 14 of the friction weld stir tool 10 is fabricated of powder metal which has been compacted and sintered to the desired shape. One advantage of powder metallurgy is that it enables the friction stir tool to be made near net shape to the desired final tool configuration without extensive post fabrication machining or secondary finishing operations of the tool. Another advantages is that it enables a wide selection of materials that might not otherwise be available for use in connection with wrought friction stir weld tools.

In one example of FIG. 5, the entire friction weld stir tool 10 is fabricated of the same powder metal material. For example, the tool may be fabricated of an iron based pre-alloyed powder metal material, such as M2 or H13 tool steels. These materials are compacted and then sintered to near net shape and may be used with little post-forming finishing of the tools.

Powder metal material is advantageous in connection with friction stir weld tools in that the inherent porous structure of the material increases the friction coefficient as compared to a wrought material. The use of powder metal also reduces the thermal conductivity as compared to wrought tools. This acts to maintain more heat at the tool/workpiece interface since the powder metal tool has less of a heat sink effect than that of a wrought tool counterpart. The base material may further be treated or altered to vary the properties, including altering the coefficient of friction and/or the wear resistance. For example, the free end 14 of the tool 10 may be steam treated under high temperature and pressure to effectively oxidize and convert the exposed surface of the tool 10 to $Fe_3O_4$, which is a highly stable form of iron oxide, that has the effect of increasing the wear resistance and friction coefficient of the base iron-based powder metal material.

The invention further contemplates admixing friction-altering powder additives with the powder metal mix to improve the tool working properties. The additives may increase or decrease the kinetic coefficient of friction of the friction stir welding tool 10 to respectively increase or decrease the heat generated during use of the friction stir welding tool 10. Accordingly, the tool 10 can be selectively manufactured to generate the desired amount of heat in use, thereby reducing workpiece-to-tool adhesion, while providing the desired weld properties, depending on the material properties of the work pieces 24, 26 be joined. The additives can be added to the powder metal mix prior to compaction, and then pressed and sintered in-situ. For example, additions $CaF_2$, MnS, $MoS_2$, BN, $CaCO_3$, silica, alumina, ceramic, carbide compounds, and other hard, stable particles, such as ferro-molybdenum, ferro-nickel, chromium and/or tribaloy, may be added to improve the working performance of the base powder metal material. The invention is not limited to any particular composition of material and, within its scope, is directed to the broad concept of using powder metallurgy to form friction weld stir tools without regard to any particular composition.

The admixing can be through the use of resin impregnation or other impregnation material to fill the porosity of at least certain portions of the tool 10 to enhance the working performance of the tool 10. The impregnation can include various materials which, as mentioned, will alter the kinetic coefficient of friction of the tool 10, the thermal conductivity, and working performance of the tool 10. This includes the infiltration of a material having a lower melting point than the base powder metal mix to fill the porosity of the powder metal materials.

The use of powder metallurgy also enables the maker of the tool 10 to alter the properties, as desired, in different regions of the tool 10. This can be done via the sintering process alone and/or through the use of mixtures of various powders, alloys, and additives to provide a hybrid of microstructures including a variety of microstructural phase gradients throughout the tool 10. For example, a combination of hard phase, soft phase and carbide precipitates in the microstructure may provide strength, ductility and wear resistance properties not available in a single phase structure. The various phases and features may include ferrite, pearlite, bainite, martensite, metal carbides, hypereutectoid and hypoeutectoid phases and various precipitates, for example.

In addition, sintering aid additives, which are added to the powder metal mix prior to compaction, can be used to facilitate manufacture of the tool 10. The sintering aid additives can improve the strength and other properties of the tool 10, such as wear resistance, a thermal properties, for example, through liquid phase, transient liquid phase or enhanced solid solution mechanisms. Some examples of sintering aid materials include, by way of example and without limitation, MoS2, phosphorous and phosphorous compounds, boron, cobalt, tin, and other materials that improve the degree of sinter and/or density of the compacted tool region.

As mentioned, different process treatments can be used on selected regions of the tool, thereby altering the composition of the material in different regions. Accordingly, as shown in FIG. 6, for example, the probe or tip 16' is made of one material which may have properties of extremely good wear resistance and high hardness in order to best function and withstand the pressures and temperatures associated with the plunging action of the probe 16' as it passes into the material and is then forced through the material under pressure and elevated temperature, whereas the shoulder region 18' may be fabricated of a different material exhibiting good wear resistance but also exhibiting a high friction coefficient to maximize the stirring capabilities of the shoulder during friction stir welding, while still further the shank 12' may be made of yet a different material if desired which may constitute a lower alloy, less expensive material that may exhibit better.

FIG. 7 is a variation on FIG. 6 in which the probe 16" and shoulder 18" regions of the tool 10" are fabricated of one powder metal material, whereas the shank 12" is fabricated of a different powder metal composition. Of course, the invention contemplates that the working free end 14" of the tool 10" could be fabricated of powder metal to achieve the advantages described herein which may be cemented or otherwise joined to a tool shank which may not necessarily be made of powder metal in order to reduce costs or offer an alternative to an all-powder metal friction weld stir tool if desired. This too is contemplated by the present invention.

FIG. 8 illustrates another gradient powder metal structure of the friction stir weld tool 10''', in which a core 34 of the tool 10''' may be fabricated of one material, such as a high load, high wear resistance material, in an outer layer or sheath or shell 36, including the shoulder region 18''' is fabricated of a different material which may be a wear resistant, but higher coefficient of friction material than that used for the core 34.

Finally, FIG. 9 illustrates another friction stir welding tool 10'''', in which various portions of the tool'''' are constructed separately from one another, and thereafter sinter bonded to one another. As such, the probe 16'''' can be compacted from one powder mixture, the shoulder 18'''' from another powder mixture, and the shank 12'''' from yet another powder mixture. Thereafter, the separate portions 16'''', 18'''', and 12'''' and be sintered together. Sintering additives or other additives can also be incorporated in one or more of the powder mixtures of the respective portions, as desired. It should be recognized that the number of portions constructed separately from one another can be varied, as necessary, to obtain the tool structure desired.

Another aspect of the invention includes a method of manufacturing a tool 10, 10', 10", 10''', 10'''' in accordance with the embodiments above. The method includes forming the various portions of the respective tool, including compacting, where the portion is constructed from powder, and joining the portions to one another, wherein at least a portion of the tool is sintered. Where adjacent ones of the respective portions 12, 16, and 18, including their various embodiments, are compacted from powder, the method further includes joining the separate portions to one another by a diffusion process within a sintering furnace. Sintering enhancement additives or other techniques can be used in the sintering process. It should be recognized that various combinations of the aforementioned tool portions, tip, shoulder, shank and shaft, may constructed as one piece or separately from one another, and joined together via the sintering process. One aspect of the manufacturing process contemplates that the sintering can be conducted in a continuous-style furnace at temperatures above 900 degrees C., and near ambient pressure, and not under a vacuum or in a closed chamber pressure vessel.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

I claim:

1. A friction stir welding tool having a welding tip fabricated of ferrous-based powder metal material, and wherein at least a portion of the welding tip contains $Fe_3O_4$ oxides.

2. The friction stir welding tool of claim 1 wherein the welding tip includes a plunger nib and a shoulder.

3. The friction stir welding tool of claim 1 wherein the ferrous-based powder metal material is admixed with at least one of alumina, carbide, ferro-molybdenum, ferro-nickel, chrome or tribaloy.

4. The friction stir welding tool of claim 2 wherein the powder metal material has gradient properties in which the tip has different properties than that of the shoulder.

5. The friction stir welding tool of claim 4 wherein the tip has higher wear resistance characteristics than that of the shoulder.

6. The friction stir welding tool of claim 1 wherein the entire tool is fabricated of powder metal.

7. The friction stir welding tool of claim 2, wherein the tip and shoulder regions of the tool are fabricated of different materials.

8. The friction stir welding tool of claim 7 wherein the tip and shoulder regions are constructed separately from one another.

9. The friction stir welding tool of claim 8 wherein the tip and shoulder regions are sintered to one another.

10. The friction stir welding tool of claim 1 wherein a central core of the tool is fabricated of a different material than that of an outer sheath of the material.

11. The friction stir welding tool of claim 7 wherein the tip of the tool is made of the core material and the shoulder is made of the sheath material.

12. The friction stir welding tool of claim 1 wherein porosity of the powder metal material is infiltrated with a material having a lower melting temperature prior to compacting.

13. The friction stir welding tool of claim 1 wherein porosity of the powder metal material is impregnated with resin.

* * * * *